(No Model.)

W. STANLEY.
ELECTRICAL APPARATUS.

No. 603,515. Patented May 3, 1898.

WITNESSES:
Frank S. Ober.
Jas. S. Oswald.

INVENTOR
William Stanley,
BY
H. B. Brownell.
ATTORNEY (No Model.)  2 Sheets—Sheet 2.
W. STANLEY.
ELECTRICAL APPARATUS.
No. 603,515.  Patented May 3, 1898.
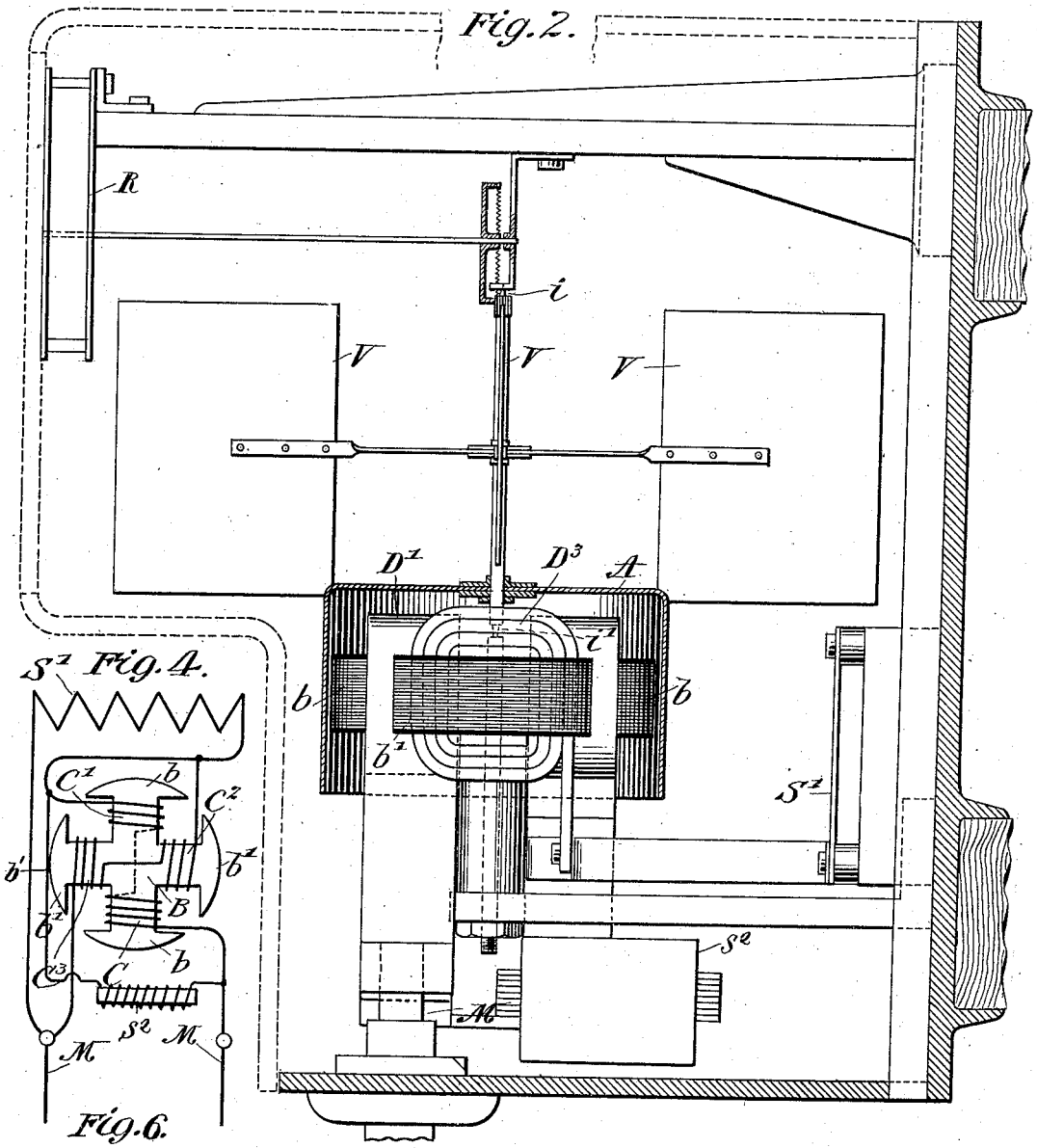
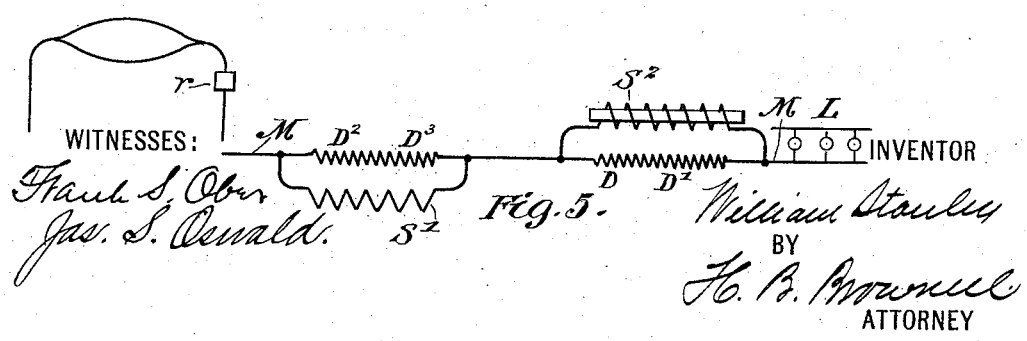
WITNESSES:
Frank S. Ober
Jas. S. Oswald
INVENTOR
William Stanley
BY
H. B. Brownell
ATTORNEY

UNITED STATES PATENT OFFICE.

WILLIAM STANLEY, OF PITTSFIELD, MASSACHUSETTS, ASSIGNOR TO THE STANLEY INSTRUMENT COMPANY, OF MASSACHUSETTS.

ELECTRICAL APPARATUS.

SPECIFICATION forming part of Letters Patent No. 603,515, dated May 3, 1898.

Application filed January 28, 1897. Serial No. 621,037. (No model.)

*To all whom it may concern:*

Be it known that I, WILLIAM STANLEY, a citizen of the United States, residing at Pittsfield, in the county of Berkshire and State of Massachusetts, have invented certain new and useful Improvements in Electrical Apparatus, of which the following is a specification.

My invention relates to electrical apparatus known as "induction" apparatus, in that it consists either in whole or in part of an induction-motor or motor device. My improvements are principally in the motor devices of such apparatus, and particularly in the combination of various parts of the energizing-circuits with external means, such as simple electromagnetic devices, so as to produce magnetic fields of different phase which will operate on a closed coil or disk armature to produce torque.

My improvements have for their objects to produce a new and useful motor device, and also new and useful apparatus of which motor devices operating in like manner forms a part.

In describing my invention I shall illustrate it by its application to an electric meter. I do not intend to imply, except where that fact is stated, that any of my improvements are limited in their application to use in meters or motors used therein, since motors and other devices employing multiphase currents embodying my improvements or some of them can be operated successfully in other and different relations. Such useful applications or embodiments will be obvious to those skilled in the art.

Figure 1:
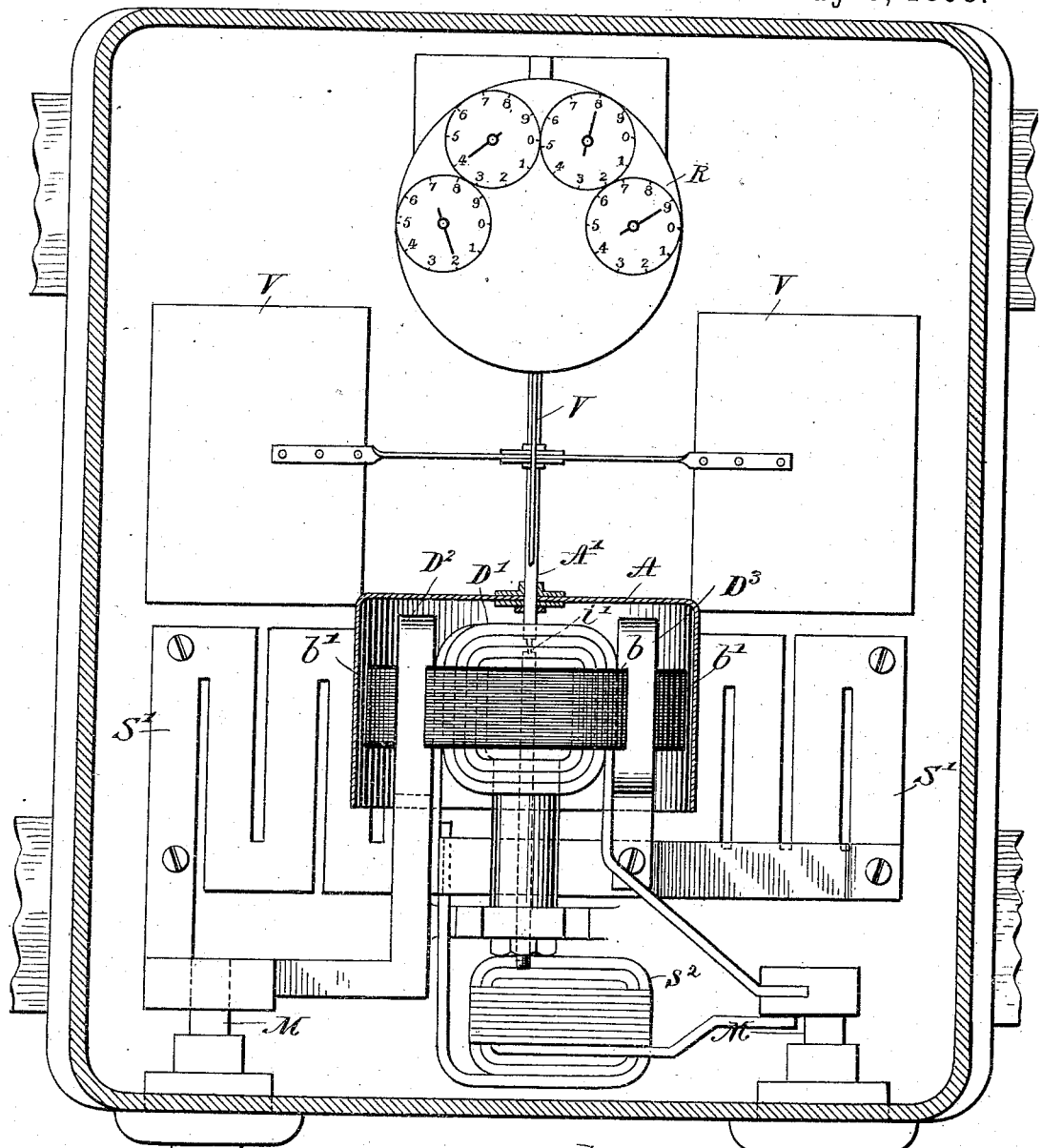
Figure 3:
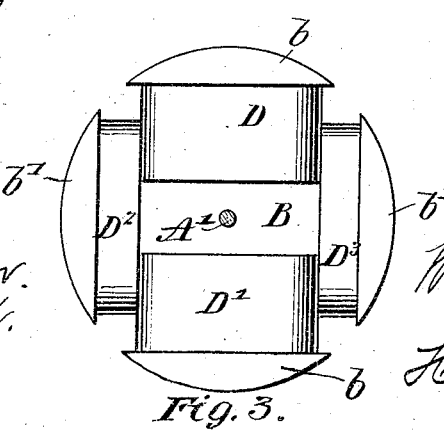

Referring to the drawings, Figure 1 shows an induction-meter embodying my improvements in front elevation. Fig. 2 shows the same in side view, partly in section. Fig. 3 shows the field-magnets. Fig. 4 shows diagram of meter connection as applied to the particular field-magnet. Fig. 5 shows diagrammatically the connections of Fig. 4. Fig. 6 is an illustrative diagram.

In the electrical apparatus embodying my invention shown in the drawings, A represents a motor-armature cylindrical in shape, made of a section of thin aluminium tubing, though other metal can be used. This armature is mounted on a shaft $A'$, journaled in bearings $i\ i'$, so as to surround the field-magnet B and rotate about it. The field-magnet B is made of laminated iron and is in the form of a cross with enlarged ends $b\ b'$, whose outer surfaces conform to segments of a cylinder. Upon the arms $C\ C'$ of this magnet is a coil $D\ D'$, consisting of two parts in series with each other. Upon the arms $C^2\ C^3$ of said magnet is a coil $D^2\ D^3$, consisting of two parts in series with each other and also with the coil $D\ D'$ and with the main M, supplying the work circuit and lamps or other translating devices L L. The coil $D\ D'$ may be considered as a single coil or a set of coils, as also may the coil $D^2\ D^3$. One of these sets of coils is separately shunted by a shunt $S'$, which has a lesser time-constant than the time-constant of the set of coils shunted. For definiteness of description the shunt $S'$ is described as having a lesser time-constant than that of the coil $D^2\ D^3$. The important feature is, however, that the time-constants of the coil and its shunt be different. The shunt may therefore have a greater time-constant $S'$ than the coil $D^2\ D^3$, as hereinafter explained. The other coil $D\ D'$ is shunted by another shunt $S^2$, which is of greater time-constant than the coil shunted. If, however, the time-constant of $S'$ is greater than that of the coil it shunts, the time-constant of $S^2$ must be less than that of the coil it shunts. In this connection I refer to the diagram shown in Fig. 6. This diagram represents two branch circuits of different time-constants in a circuit of some resistance $r$. If the common terminals are connected with a source of alternating current, the phase of the current in that branch which has the lesser time-constant advances relatively to the phase of the current in the main line and the phase of the current in the other branch lags behind the main-current phase. By proper proportioning of the time-constant values of the two circuits in parallel connection the phase of the current in one branch can be considerably advanced, while the current in the other can be considerably retarded. I make use of these phenomona in my invention as follows:

Fig. 5 represents, diagrammatically, the electrical connections as they are in one embodiment of my invention. In this figure the coil marked D D' corresponds with the set of coils on the portions C C' of the field-magnet. The coil D² D³ corresponds with the coil on the portions C² C³. The shunt S' is the shunt about the coil D² D³ and has a lesser time-constant than that of the coil D² D³. S² is the shunt about the coil D D'.

From what has been said in the paragraph next but one preceding it will be seen that the current in the coil D² D³ will be later in phase than the main current and that the current in the coil D D' will be earlier in phase than that of the main current. These two coils D D' and D² D³, I use to energize the field-magnets of a motor, and since the phases of the magnetic flux produced thereby correspond with the phases of their exciting-currents the magnetic fluxes of the field-magnets differ in phase to the same extent as the energizing-currents. By this means from a single source of alternating electrical energy I produce by two coils in series with each other two magnetic fluxes of different phase. With but one shunt, either S' or S², the practical phase difference must be less than ninety degrees. Even in that case the phasal difference is maintained by the action of the counter electromotive force in the shunt acting at a different time from that in the coil shunted.

The proper proportions for producing certain differences of phase can easily be obtained and the requirements therefor are well within the knowledge of those skilled in the art.

As embodied in electrical apparatus of the class known as current-meters my invention is of great practical value. The armature in the preferred form is as shown in the drawings and heretofore described. It is carried by a shaft free to revolve. The shaft carries a gear or worm and as it revolves the number of revolutions is recorded by the registering mechanism R. The currents energizing the field-magnets vary directly as the quantity of the main current, and the strength of the magnetic flux varies accordingly. It follows from the well-known law of induction-motors that the torque on the armature increases, and consequently the speed varies directly as the square of the current in the motor-coils.

In order to have the meter register accurately, its speed must be kept relatively low by some retarding device, and the action of the retarding device must follow the same law as the law of motor torque. A fan is such a retarding device. I therefore attach to the shaft in planes parallel to the axis several vanes V, of thin aluminium, though other light material may be used. A meter so constructed will measure accurately the quantity of the current flowing to the translating devices.

In case my invention is used in meters of the indicating non-integrating type the fluxes would be used to act upon an armature free to revolve but a part of a revolution, as is well understood by those skilled in the art.

What I claim is—

1. In an electrical apparatus, two coils in series with each other, and with a source of alternating current, in combination with two shunts, one of less, the other of greater time-constant than the coils which they respectively shunt, and a closed circuited armature in direct inductive relation to the fluxes produced by both coils, substantially as described.

2. In an electric meter, two coils in series with each other and with a source of alternating current, in combination with two shunts, one of less, the other of greater time-constant than the coils which they respectively shunt and a closed circuited armature in direct inductive relation to the fluxes produced by both coils, together with suitable retarding and registering devices, substantially as described.

WILLIAM STANLEY.

Witnesses:
FREDERICK DARLINGTON,
MICHAEL L. EISNER.